(12) United States Patent
Onizuka

(10) Patent No.: US 9,437,902 B2
(45) Date of Patent: Sep. 6, 2016

(54) METHOD OF MANUFACTURING NONAQUEOUS ELECTROLYTE SECONDARY BATTERY

(71) Applicant: TOYOTA JIDOSHA KABUSHIKI KAISHA, Toyota-shi, Aichi (JP)

(72) Inventor: Hiroshi Onizuka, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/423,645

(22) PCT Filed: Apr. 30, 2013

(86) PCT No.: PCT/JP2013/062603
§ 371 (c)(1),
(2) Date: Feb. 24, 2015

(87) PCT Pub. No.: WO2014/038245
PCT Pub. Date: Mar. 13, 2014

(65) Prior Publication Data
US 2015/0207173 A1    Jul. 23, 2015

(30) Foreign Application Priority Data

Sep. 7, 2012 (JP) ................................ 2012-197542

(51) Int. Cl.
*H01M 4/00* (2006.01)
*H01M 10/0567* (2010.01)
(Continued)

(52) U.S. Cl.
CPC ........... *H01M 10/0567* (2013.01); *H01M 4/13* (2013.01); *H01M 10/0413* (2013.01);
(Continued)

(58) Field of Classification Search
CPC ................... H01M 10/0567; H01M 10/0568; H01M 10/0569; H01M 2300/0037; H01M 2300/0042
See application file for complete search history.

(56) References Cited

U.S. PATENT DOCUMENTS 9,029,022 B2 * 5/2015 Miyagi ............... H01M 2/0287
429/188
2002/0061450 A1 5/2002 Tsujioka et al.
(Continued)

FOREIGN PATENT DOCUMENTS

JP    2005-259592 A    9/2005
JP    3730855 B2      10/2005
(Continued)

OTHER PUBLICATIONS

International Search Report for PCT/JP2013/062603 dated Jul. 30, 2013.

*Primary Examiner* — Jane Rhee
(74) *Attorney, Agent, or Firm* — Sughrue Mion, PLLC

(57) ABSTRACT

The manufacturing method of the invention includes the steps of: providing a positive electrode and a negative electrode (S10), a sodium ingredient being included in either the positive electrode or the negative electrode; producing an electrode assembly from the provided positive electrode and negative electrode (S20); producing a battery assembly in which the electrode assembly is housed in a battery case (S30); injecting a nonaqueous electrolyte solution into the battery case (S40), the nonaqueous electrolyte solution including at least lithium bis(oxalato)borate, a fluorophosphate compound, a carbonate solvent and an ether solvent, and the amount of ether solvent included in the nonaqueous electrolyte solution being less than 10 vol % when the amount of nonaqueous solvent included in the nonaqueous electrolyte solution is set to 100 vol %; and charging and discharging the battery assembly (S50).

10 Claims, 7 Drawing Sheets

(51) Int. Cl.
| | |
|---|---|
| *H01M 10/052* | (2010.01) |
| *H01M 10/0568* | (2010.01) |
| *H01M 10/0569* | (2010.01) |
| *H01M 10/0587* | (2010.01) |
| *H01M 10/04* | (2006.01) |
| *H01M 10/42* | (2006.01) |
| *H01M 4/13* | (2010.01) |
| *H01M 10/44* | (2006.01) |
| *H01M 4/131* | (2010.01) |
| *H01M 4/133* | (2010.01) |
| *H01M 4/02* | (2006.01) |

(52) U.S. Cl.
CPC ..... *H01M10/0431* (2013.01); *H01M 10/0436* (2013.01); *H01M 10/052* (2013.01); *H01M 10/0568* (2013.01); *H01M 10/0569* (2013.01); *H01M 10/0587* (2013.01); *H01M 10/4235* (2013.01); *H01M 10/446* (2013.01); *H01M 4/131* (2013.01); *H01M 4/133* (2013.01); *H01M 2004/027* (2013.01); *H01M 2004/028* (2013.01); *H01M 2220/20* (2013.01); *H01M 2220/30* (2013.01); *H01M 2300/0037* (2013.01); *H01M 2300/0042* (2013.01); *Y02E 60/122* (2013.01); *Y02P 70/54* (2015.11); *Y02T 10/7011* (2013.01); *Y10T 29/49115* (2015.01)

(56) References Cited

U.S. PATENT DOCUMENTS

| | | |
|---|---|---|
| 2005/0233222 A1 | 10/2005 | Yanagida et al. |
| 2010/0015514 A1 | 1/2010 | Miyagi et al. |

FOREIGN PATENT DOCUMENTS

| | | |
|---|---|---|
| JP | 2007-165125 A | 6/2007 |
| JP | 2007-180015 A | 7/2007 |
| JP | 2009-176534 A | 8/2009 |
| JP | 2012-064456 A | 3/2012 |
| KR | 1020080056226 A | 6/2008 |
| WO | 2012/020769 A1 | 2/2012 |
| WO | 2015001871 A1 | 1/2015 |

* cited by examiner

METHOD OF MANUFACTURING NONAQUEOUS ELECTROLYTE SECONDARY BATTERY

TECHNICAL FIELD

This invention relates to a method of manufacturing a nonaqueous electrolyte secondary battery.

This application is a National Stage of International Application No. PCT/JP2013/062603 filed Apr. 30, 2013, claiming priority based on Japanese Patent Application No. 2012-197542 filed Sep. 7, 2012, the contents of all of which are incorporated herein by reference in their entirety.

BACKGROUND ART

Lithium ion secondary batteries and other nonaqueous electrolyte secondary batteries are of increasing importance as on-board power sources for vehicles and power sources for personal computers and handheld devices. In particular, lithium ion secondary batteries, which are lightweight and can achieve a high-energy density, are desirable as high-output on-board power sources for vehicles.

However, in nonaqueous electrolyte secondary batteries such as lithium ion secondary batteries, some of the nonaqueous electrolyte solution decomposes during charging, and a film made up of the products of such decomposition, known as a solid electrolyte interface (SEI) film, may form on surfaces of the negative electrode active material (e.g., natural graphite particles). Although a SEI film does serve to protect the negative electrode active material, formation of the film involves the consumption of charge carriers (e.g., lithium ion) within the nonaqueous electrolyte solution. That is, because the charge carriers are immobilized within the SEI film, they can no longer contribute to the battery capacity. Therefore, the formation of a large amount of SEI film is a major cause of declines in the capacity ratio (declines in the cycle characteristics).

To address this problem, various types of additives have been included in the nonaqueous electrolyte solution so as to form beforehand a stable film on the surface of the negative electrode active material instead of a SEI film. For example, Patent Literature 1 discloses a nonaqueous electrolyte solution for secondary batteries which contains lithium bis(oxalato)borate ($Li[B(C_2O_4)_2]$) as an additive.

CITATION LIST

Patent Literature

Patent Literature 1: JP 2005-259592 A

SUMMARY OF INVENTION

Technical Problem

However, sodium ingredients (e.g., sodium salts) are present as incidental impurities in the electrode assemblies of nonaqueous electrolyte secondary batteries having a positive electrode and a negative electrode. When a nonaqueous electrolyte solution is impregnated into a sodium ingredient-containing electrode assembly, the sodium ingredient dissolves in the nonaqueous electrolyte solution. In cases where the lithium bis(oxalato)borate-containing nonaqueous electrolyte solution disclosed in Patent Literature 1 has been injected into the electrode assembly, the sodium ions ($Na^+$) within the nonaqueous electrolyte solution diffuse more rapidly than the $[B(C_2O_4)_2]^-$ ions. As a result, in cases where the electrode assembly is one that has been formed by stacking or winding together positive and negative electrodes of rectangular shape, the sodium ions have a tendency to collect at the center portion in the width direction perpendicular to the lengthwise direction of the electrode assembly. That is, the sodium ion concentration becomes high at the center portion in the width direction. The $[B(C_2O_4)_2]^-$ ions diffuse more slowly to this center portion where the sodium ion concentration is high. As a result, sodium ions actively associate with $[B(C_2O_4)_2]^-$ ions at the center in the width direction of the electrode assembly, which tends to lead to the deposition of $Na[B(C_2O_4)_2]$ in places. As a result, places where a large amount of $Na[B(C_2O_4)_2]$ is present and places where a small amount of $[B(C_2O_4)_2]^-$ ions is present form at the center of the electrode assembly, and so, depending on the decomposition of $[B(C_2O_4)_2]$, variations may arise in the amount of film that forms. Thus, on the surface of the negative electrode active material at the center of the electrode assembly in the width direction thereof, there are places where the film that forms due to the decomposition of $[B(C_2O_4)_2]$ is present in a large amount and places where the film is present in a small amount. With long-term use, the places where the film is present in a small amount have a tendency to deteriorate, sometimes leading to an increase in the resistance at those places. Accordingly, when charging and discharging are repeatedly carried out, a substance derived from the charge carrier (e.g., a metal such as lithium metal) may end up depositing at those places at the center of the electrode assembly where the resistance is locally high.

The invention was conceived in order to solve this problem in the art. The object of the invention is to provide a method of manufacturing nonaqueous electrode secondary batteries in which the deposition of substances derived from the charge carrier is suppressed by the formation of a more preferred film on the surface of the negative electrode active material.

Solution to Problem

The inventors have discovered that the foregoing object can be achieved by using a solvent of higher polarity than carbonate solvents as part of the nonaqueous solvent in a lithium bis(oxalato)borate-containing nonaqueous electrolyte solution and also including certain additives in the nonaqueous electrolyte solution.

To achieve this object, the invention provides a method of manufacturing nonaqueous electrolyte secondary batteries. The manufacturing method disclosed herein includes the steps of providing a positive electrode that contains a positive electrode active material and a negative electrode that contains a negative electrode active material, at least one of the provided positive electrode and negative electrode including a sodium (Na) ingredient as an incidental impurity; producing an electrode assembly from the provided positive electrode and negative electrode; producing a battery assembly in which the electrode assembly is housed in a battery case; injecting a nonaqueous electrolyte solution into the battery case, the nonaqueous electrolyte solution including at least, as additives, lithium bis(oxalato)borate and a fluorophosphate compound in which fluorine and phosphorus serve as structural elements and, as nonaqueous solvents, a carbonate solvent and an ether solvent, and the amount of ether solvent included in the nonaqueous electrolyte solution being less than 10 vol % when the amount of nonaqueous solvent included in the nonaqueous electrolyte solution is set to 100 vol %; and charging the battery assembly to a predetermined charge voltage, then discharging the battery assembly to a predetermined discharge voltage.

In this description, "nonaqueous electrolyte secondary battery" refers to a battery provided with a nonaqueous electrolyte solution (typically an electrolyte solution containing a supporting salt (supporting electrolyte) in a nonaqueous solvent (organic solvent)).

"Secondary battery" in this description is a term that refers in general to batteries capable of being repeatedly charged and discharged, and encompasses so-called chemical batteries such as lithium ion secondary batteries and physical batteries such as electric double-layer capacitors.

Moreover, "sodium (Na) ingredient" in this description is a term that encompasses cases in which sodium is present by itself (typically, in the state of ions) and cases in which sodium is present in a sodium-containing compound serving as a structural element.

In the method of manufacturing a nonaqueous electrolyte secondary battery provided by this invention, after injecting into the battery case a nonaqueous electrolyte solution containing lithium bis(oxalato)borate, a fluorophosphate compound, and less than 10 vol % of an ether solvent, predetermined charging and discharging operations are carried out on the battery assembly.

Because the nonaqueous electrolyte solution includes, as a nonaqueous solvent, an ether solvent having a higher polarity than carbonate solvents and having an excellent solvency, the deposition of $Na[B(C_2O_4)_2]$ on the electrode assembly is suppressed. As a result, a large amount of $Na[B(C_2O_4)_2]$ ceases to be locally present in the center portion of the electrode assembly and the film that forms on the surface of the negative electrode active material owing to the decomposition of $[B(C_2O_4)_2]$ is able to achieve a state in which the variation in the amount of the film has been minimized (the film preferably being in a uniform state in the width direction). Also, because a nonaqueous electrolyte solution containing an ether solvent in an amount of less than 10 vol % is used, even when charging and discharging of the nonaqueous electrolyte secondary battery obtained by this manufacturing method is repeatedly carried out, increases in the internal resistance of the battery can be kept low. During charging and discharging of the secondary battery, the ether solvent has a tendency to undergo oxidative decomposition at the positive electrode, and so there is a concern that when the ether solvent is oxidized at the positive electrode, the positive electrode resistance may increase. However, because a nonaqueous electrolyte solution containing a fluorophosphate compound is used in this production method, a film derived from this fluorophosphate compound forms on the surface of the positive electrode (typically, the surface of the positive electrode active material) during charging and discharging. Hence, because oxidative decomposition of the ether solvent is suppressed during charging and discharging of the nonaqueous electrolyte secondary battery, it is possible to suppress increases in the positive electrode resistance even when an ether solvent is used. Therefore, in a nonaqueous electrolyte secondary battery provided with an electrode assembly wherein variation in the amount of film has been minimized, even when the film has deteriorated due to repeated charging and discharging, because local deterioration of the film is suppressed, local concentration of the current is prevented, minimizing the deposition of substances derived from the charge carrier (e.g., lithium metal). Accordingly, nonaqueous electrolyte secondary batteries manufactured by this method have an electrode assembly in which variation in the amount of film have been minimized, so that even in cases where the film has deteriorated due to repeated charging and discharging, local deterioration of the film is suppressed. As a result, the local concentration of the current is prevented, making it possible to suppress the deposition within the electrode assembly (e.g., the negative electrode) of substances derived from the charge carrier (e.g., lithium metal).

In a preferred embodiment of the manufacturing method disclosed herein, a chain ether and/or a cyclic ether is used as the ether solvent. For example, dimethoxyethane and/or 1,2-dimethoxypropane may be used as the chain ether.

The chain ether or cyclic ether can be advantageously used as a solvent that dissolves $Na[B(C_2O_4)_2]$. With these differing ether solvents, the deposition of $Na[B(C_2O_4)_2]$ on the electrode assembly prior to initial charging/discharging is suppressed.

In another preferred embodiment of the manufacturing method disclosed herein, the fluorophosphate compound is lithium difluorophosphate, the concentration of lithium difluorophosphate in the nonaqueous electrolyte solution being from 0.01 mol/L to 0.15 mol/L.

By setting the concentration of lithium difluorophosphate in this range, a film that is capable of suppressing oxidative decomposition of the ether solvent can be formed on the surface of the positive electrode active material without lowering the battery performance.

In yet another preferred embodiment of the manufacturing method disclosed herein, the concentration of the lithium bis(oxalato)borate in the nonaqueous electrolyte solution is from 0.005 mol/L to 0.05 mol/L.

By setting the lithium bis(oxalato)borate concentration in this range, a film in a desirable state can be formed on the surface of the negative electrode active material without lowering the battery performance.

In still another preferred embodiment of the manufacturing method disclosed herein, a wound electrode assembly, which is obtained by stacking together a positive electrode formed as a sheet and a negative electrode formed as a sheet to obtain an electrode assembly, and winding the electrode assembly in a lengthwise direction of the electrode assembly, is used as the electrode assembly.

In a wound electrode assembly having this construction, the nonaqueous electrolyte impregnates from both edges toward the center in the width direction of the electrode assembly. Hence, the concentration of the sodium ingredient rises at the center of the wound electrode assembly, and there is a tendency for places where a large amount of $Na[B(C_2O_4)_2]$ is present and places where a small amount of $[B(C_2O_4)_2]^-$ ions is present to form in the center portion of the electrode assembly. Therefore, in cases where such a wound electrode assembly is used, advantageous effects are particularly achievable by virtue of the use, according to the invention, of a nonaqueous electrolyte solution containing lithium bis(oxalato)borate, a fluorophosphate compound and less than 10 vol % of an ether solvent.

In another preferred embodiment of the method of manufacturing secondary batteries disclosed herein, a lithium-containing compound capable of intercalating and deintercalating lithium ions is used as the positive electrode active material. This enables a positive electrode having an even better power performance to be achieved.

In another aspect that achieves the above objects, the invention also provides a nonaqueous electrolyte secondary battery obtained by any one of the manufacturing methods disclosed herein.

In the nonaqueous electrolyte secondary batteries obtained by any of the manufacturing methods disclosed herein (e.g., lithium ion secondary batteries), because the film that arises due to the decomposition of [B(C$_2$O$_4$)$_2$] has been formed in a desirable state (a state in which the variation in the amount of film is small) on the surface of the negative electrode active material, the deposition of substances (such as lithium metal) derived from the charge carrier is prevented, enabling a nonaqueous electrolyte secondary battery having an excellent battery performance to be obtained. As a result, this can be used as a power source for driving vehicles (typically automobiles, and especially hybrid cars, electric cars, and cars provided with electric motors such as fuel cell cars). Yet another aspect of the invention provides vehicles having, as the power source for driving the vehicle, a nonaqueous electrolyte secondary battery obtained by any of the manufacturing method disclosed herein (which batteries may be in the form of a battery pack in which a plurality (e.g., from 40 to 80) batteries are typically connected in series).

In still another aspect that achieves the above objects, the invention provides a nonaqueous electrolyte solution adapted for use in nonaqueous electrolyte secondary batteries. The nonaqueous electrolyte solution provided by the invention includes at least, as additives, lithium bis(oxalato) borate and a fluorophosphate compound in which fluorine and phosphorus serve as structural elements and, as nonaqueous solvents, a carbonate solvent and an ether solvent. The amount of ether solvent included in the nonaqueous electrolyte solution is less than 10 vol % when the amount of nonaqueous solvent included in the nonaqueous electrolyte solution is set to 100 vol %.

This nonaqueous electrolyte solution is able to suppress the deposition of Na[B(C$_2$O$_4$)$_2$] while suppressing a rise in the battery resistance.

BRIEF DESCRIPTION OF DIAGRAMS

DESCRIPTION OF EMBODIMENTS

Preferred embodiments of the invention are described below. Note that technical matters which are required for carrying out the present invention but are not particularly mentioned in the present description are matters of design that could be apprehended by a person skilled in the art based on prior art in the field in question. The present invention can be practiced based on the technical details disclosed in the present description and on common general technical knowledge in the field in question.

A method of manufacturing lithium ion secondary batteries is described in detail below as an example of a preferred embodiment of the method of manufacturing nonaqueous electrolyte secondary batteries disclosed herein, although applications of this invention are not intended to be limited to this type of secondary battery. For example, application to nonaqueous electrolyte secondary batteries which use other metal ions (e.g., magnesium ions) as the charge carrier is also possible.

Figure 3:
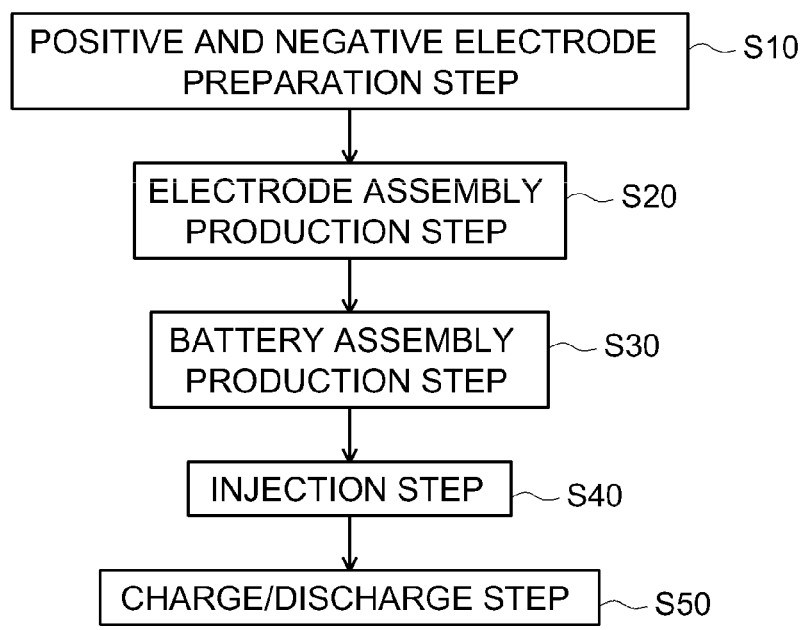
FIG. 3 is a flow chart illustrating the method of manufacturing nonaqueous electrolyte secondary batteries according to an embodiment of the invention.

The method of manufacturing lithium ion secondary batteries (nonaqueous electrolyte secondary batteries) disclosed herein includes, as shown in FIG. 3, the step of providing a positive electrode and a negative electrode (S10), an electrode assembly production step (S20), an assembly body production step (S30), an injection step (S40), and a charge/discharge step (S50).

Positive and Negative Electrode Furnishing Step (S10)

First, the step of providing a positive electrode and a negative electrode (S10) is described. In this embodiment, this step entails providing a positive electrode that contains a positive electrode active material and providing a negative electrode that contains a negative electrode active material. In a preferred embodiment, this step also encompasses additionally providing a separator to be disposed between the positive electrode and the negative electrode. Here, at least one of the provided positive electrode and negative electrode includes a sodium (Na) ingredient as an incidental impurity.

The negative electrode of the lithium ion secondary battery disclosed herein has a negative electrode current collector and, formed on the surface of the negative electrode current collector, a negative electrode mixture layer containing at least a negative electrode active material. In addition to the negative electrode active material, the negative electrode mixture layer may also include, if necessary, optional ingredients such as a binder and a thickener.

The negative electrode current collector, as with current collectors used in the negative electrodes of conventional lithium ion secondary batteries, is preferably a conductive member made of a metal having good electrical conductivity. For example, copper, nickel, or an alloy made primarily of these may be used. The shape of the negative electrode current collector may vary depending on such factors as the shape of the lithium ion secondary battery, and is thus not particularly limited. For example, the negative electrode current collector may be in the form of a foil, sheet, rod or plate.

One, two or more types of material used in conventional lithium ion secondary batteries may be used without particular limitation as the negative electrode active material. Illustrative examples include particulate (or spherical or flake-like) carbon materials which contain at least in part a graphite structure (layered structure), lithium-transition metal mixed oxides (e.g., lithium-titanium mixed oxides such as Li$_4$Ti$_5$O$_{12}$), and lithium-transition metal mixed nitrides. Carbon materials are exemplified by natural graphite, synthetic graphite (artificial graphite), non-graphitizable carbon (hard carbon) and graphitizable carbon (soft carbon). The negative electrode active material has an average particle size of from about 1 μm to about 50 μm (generally from about 5 μm to about 30 μm). Average particle size refers here to the median diameter (D50: 50% average particle diameter, volume basis) derived from the particle size distribution measured with any of various commercially available particle size analyzers based on the laser light diffraction/scattering method. The surface of the negative electrode active material may be coated with an amorphous carbon film. For example, by mixing pitch into the negative electrode active material and firing the mixture, a negative electrode active material that is at least partially coated with an amorphous carbon film can be obtained.

A binder similar to any of those used in the negative electrodes of ordinary lithium ion secondary batteries may be suitably used as the binder. For example, in cases where an aqueous paste-like composition is used to form the negative electrode mixture layer, preferred use can be made of a water-soluble polymeric material or a water-dispersible polymeric material. Illustrative examples of water-dispersible polymers include rubbers such as styrene-butadiene rubbers (SBR), polyethylene oxides (PEO) and vinyl acetate copolymers. The use of a styrene-butadiene rubber is preferred.

Here, "aqueous paste-like composition" is a concept that refers to a composition in which water or a mixed solvent made primarily of water is used as the dispersing medium for the negative electrode active material. The solvent other than water in such a mixed solvent may be one, two or more solvent suitably selected from among organic solvents capable of uniformly mixing with water (e.g., lower alcohols, lower ketones).

The thickener may be, for example, a water-soluble or water-dispersible polymer. Illustrative examples of water-soluble polymers include cellulosic polymers such as carboxymethyl cellulose (CMC), methyl cellulose (MC), cellulose acetate phthalate (CAP) and hydroxypropylmethyl cellulose (HPMC); and polyvinyl alcohol (PVA). Alternatively, materials similar to those mentioned above as examples of the binder may be suitably used.

The negative electrode disclosed here may be preferably produced by, generally, the following sequence. A paste-like negative electrode mixture layer-forming composition obtained by dispersing the negative electrode active material and other, optional, ingredients (such as binders and thickeners) in a suitable solvent (e.g., water) is prepared. By coating the prepared composition onto a negative electrode current collector and drying the composition, then pressing, a negative electrode having a negative electrode current collector and a negative electrode mixture layer formed on the negative electrode current collector can be produced. The negative electrode thus produced includes a sodium (Na) ingredient as an incidental impurity. In this embodiment, the sodium (Na) ingredient which is an incidental impurity refers to an ingredient that is capable of dissolving in the nonaqueous electrolyte solution. Unless noted otherwise, the same applies below.

The positive electrode of the lithium ion secondary battery disclosed herein has a positive electrode current collector and, formed on the surface of the positive electrode current collector, a positive electrode mixture layer containing at least a positive electrode active material. In addition to the positive electrode active material, the positive electrode mixture layer may also include, if necessary, optional ingredients such as a conductive material and a binder.

The positive electrode current collector, as with current collectors used in the positive electrodes of conventional lithium ion secondary batteries, may be aluminum or an aluminum alloy made primarily of aluminum. The shape of the positive electrode current collector may be similar to the shape of the negative electrode current collector.

The positive electrode active material is a material which is capable of intercalating and deintercalating lithium ions, and is exemplified by lithium-containing compounds containing lithium and one, two or more transition metal element (e.g., lithium-transition metal mixed oxides). Illustrative examples include lithium-nickel mixed oxides (e.g., $LiNiO_2$), lithium-cobalt mixed oxides (e.g., $LiCiO_2$), lithium-manganese mixed oxides (e.g., $LiMn_2O_4$), and ternary lithium-containing mixed oxides such as lithium-nickel-cobalt-manganese mixed oxides (e.g., $LiNi_{1/3}Co_{1/3}Mn_{1/3}O_2$).

Alternatively, polyanionic compounds designated by the general formulas $LiMPO_4$, $LiMVO_4$ or $Li_2MSiO_4$ (wherein M is one or more element from among Co, Ni, Mn and Fe), examples of which include $LiFePO_4$, $LiMnPO_4$, $LiFeVO_4$, $LiMnVO_4$, $Li_2FeSiO_4$, $Li_2MnSiO_4$, $Li_2CoSiO_4$, may be used as the positive electrode active material.

The positive electrode active material may be produced by any of various methods. A case in which the positive electrode active material is a lithium-nickel-cobalt-manganese mixed oxide is described here by way of illustration. A lithium-nickel-cobalt-manganese mixed oxide can be obtained by preparing a hydroxide containing, for example, Ni, Co and Mn in the target molar ratio (e.g., a NiCoMn mixed hydroxide of the formula $Ni_{1/3}Co_{1/3}Mn_{1/3}(OH)_2$), then mixing this hydroxide and a lithium source so that the molar ratio therebetween becomes the target value and firing the mixture. The NiCoMn mixed hydroxide can be more preferably prepared by, for example, co-precipitation. Firing is typically carried out in an oxidizing atmosphere (e.g., in open air). The firing temperature is preferably from 700° C. to 1,000° C. In co-precipitation, because the NiCoMn mixed hydroxide is prepared using a relatively high-concentration sodium hydroxide, the lithium-nickel-cobalt-manganese mixed oxide that has formed as mentioned above tends to include a sodium ingredient (e.g., $Na_2SO_4$) as an impurity.

The conductive material is not limited to a specific conductive material, provided it is one that has hitherto been used in lithium ion secondary batteries of this type. For example, carbon materials such as carbon powder or carbon fibers may be used. Carbon powders that may be used include various types of carbon blacks (acetylene black, furnace black, ketjen black), and graphite powders. Of these, preferred carbon powders include acetylene black (AB). Such conductive materials may be of one type used alone or may be of two or more types used in a suitable combination.

A binder similar to any of those used in the positive electrodes of ordinary lithium ion secondary batteries may be suitably used as the binder. For example, in cases where a solvent-based paste-like composition ("paste-like composition" here encompassing slurry-like compositions and ink-like compositions) is used to form the positive electrode mixture layer, preferred use can be made of a polymeric material which dissolves in an organic solvent (nonaqueous solvent), such as polyvinylidene fluoride (PVDF) or polyvinylidene chloride (PVDC). Alternatively, in cases where an aqueous paste-like composition is used, preferred use can be made of a polymeric material that is water-soluble (dissolves in water) or a polymeric material that is water-dispersible (disperses in water). Illustrative examples include polytetrafluoroethylene (PTFE), carboxymethyl cellulose (CMC) and styrene-butadiene rubber (SBR). Aside from being used as binders, the polymeric materials mentioned above may also be used as thickeners and other additives in this composition.

Here, "solvent-based paste-like composition" is a concept that refers to a composition in which the dispersing medium for the positive electrode active material is primarily an organic solvent (nonaqueous solvent). An example of an organic solvent that may be used is N-methyl-2-pyrrolidone (NMP).

The positive electrode disclosed herein may be advantageously produced by, generally, the following sequence. A paste-like positive electrode mixture layer-forming composition is prepared by dispersing in an organic solvent: the positive electrode active material, the conductive material, and the binder that is soluble in an organic solvent. By applying the prepared composition onto a positive electrode current collector and drying the composition, then pressing, a positive electrode having a positive electrode current collector and, formed on the positive electrode current collector, a positive electrode mixture layer can be produced. The positive electrode thus produced can include a sodium (Na) ingredient as an incidental impurity.

A conventional separator known to the art may be used without particular limitation as the separator. For example, a porous sheet made of resin (microporous resin sheet) can be advantageously used for this purpose. A porous polyolefin resin sheet made of polyethylene (PE), polypropylene (PP) or the like is preferred. For example, preferred use can be made of a PE sheet, a PP sheet and a sheet having a three-layer structure made up of a PE layer with PP layers laminated on either side thereof (PP/PE/PP). Because the separator often uses as the plasticizer a sodium ingredient-containing compound, when the nonaqueous electrolyte solution is impregnated into this separator, the sodium ingredient dissolves in the nonaqueous electrolyte solution.

Electrode Assembly Production Step (S20)

Next, the electrode assembly production step (S20) is described. In this step, an electrode assembly is produced using the positive electrode and negative electrode that have been provided. Typically, the electrode assembly is produced using the positive electrode, negative electrode and separator that have been provided.

The electrode assembly (e.g., a stacked electrode assembly or wound electrode assembly) of the lithium ion secondary battery disclosed herein has a positive electrode, a negative electrode and a separator interposed between the positive electrode and the negative electrode. A wound electrode assembly which includes the above positive electrode formed as a sheet, the above negative electrode formed as a sheet and the above separator sheet is described here by way of illustration, although the electrode assembly is not intended to be limited to this form.

Figure 2:
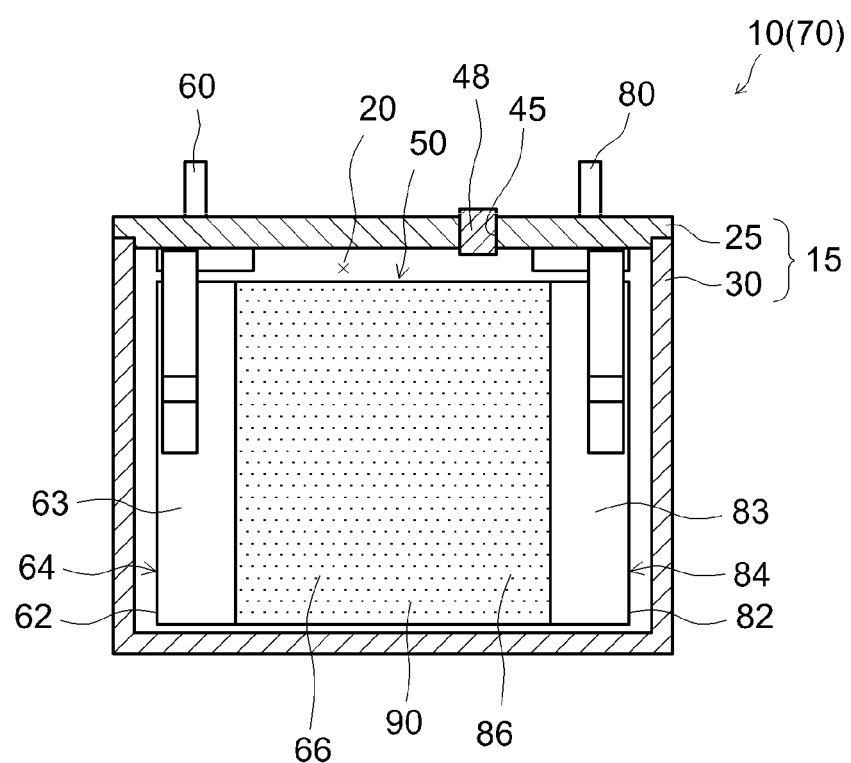
FIG. 2 is a cross-sectional view taken along line II-II in FIG. 1.

FIG. 2 shows a wound electrode assembly 50 according to this embodiment. Referring to FIG. 2, the wound electrode assembly 50 is a flattened shape that has been produced by stacking a positive electrode 64 in the shape of a sheet and a negative electrode 84 in the shape of a sheet together with two long separator sheets 90 therebetween, winding these stacked sheets in the lengthwise direction, then laterally pressing and squashing the resulting wound assembly.

During stacking, the positive electrode 64 and the negative electrode 84 are arranged over one another at a mutual offset in the width direction, in such a way that a positive electrode mixture layer-free region 63 of the positive electrode 64 (that is, a region where a positive electrode mixture layer 66 has not been formed, leaving a positive electrode current collector 62 exposed) and a negative electrode mixture layer-free region 83 of the negative electrode 84 (that is, a region where a negative electrode mixture layer 86 has not been formed, leaving a negative electrode current collector 82 exposed) respectively protrude beyond either edge of the separator sheet 90 in the width direction. As a result, the electrode mixture layer-free regions 63, 83 of the positive electrode 64 and the negative electrode 84 respectively protrude outside of the wound core region (i.e., the region where the positive electrode mixture layer 66 of the positive electrode 64, the negative electrode mixture layer 86 of the negative electrode 84, and the two separator sheets 90 are closely wound together) in the width direction with respect to the winding direction of the wound electrode assembly 50. A positive electrode terminal 60 (made of aluminum, for example) is joined to the positive electrode mixture layer-free region 63, electrically connecting the positive electrode 64 of the wound electrode assembly 50 that has been formed to a flattened shape with the positive electrode terminal 60. Similarly, a negative electrode terminal 80 (made of nickel, for example) is joined to the negative electrode mixture layer-free region 83, electrically connecting the negative electrode 84 with the negative electrode terminal 80. The positive electrode terminal 60 and the negative electrode terminal 80 can be joined to, respectively, the positive electrode current collector 62 and the negative electrode current collector 82 by ultrasonic welding, resistance welding or the like.

Battery Assembly Production Step (S30)

Next, the battery assembly production step (S30) is described. In this embodiment, a battery assembly 70 is produced by housing the electrode assembly 50 produced as described above within a battery case 15.

Figure 1:
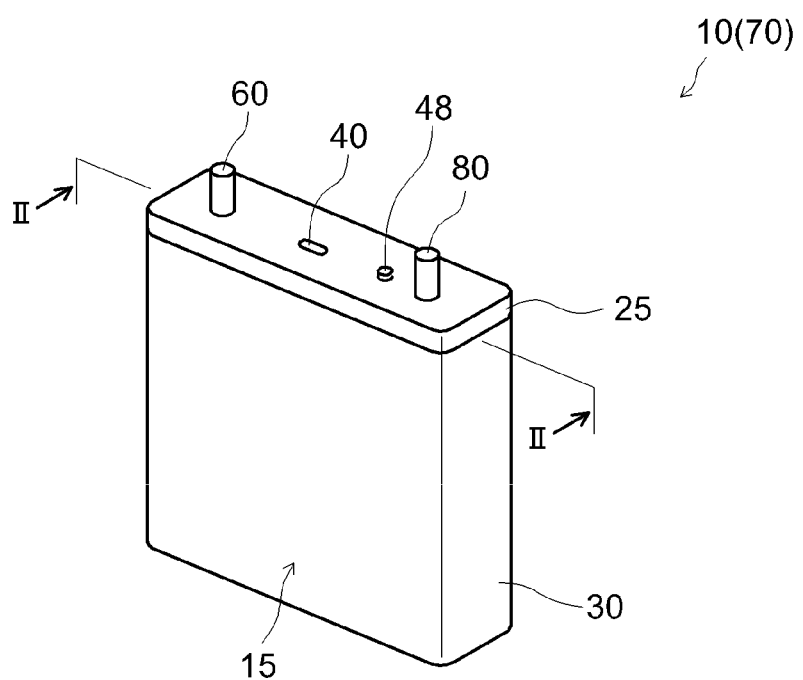
FIG. 1 is a perspective view schematically showing the external shape of a nonaqueous electrolyte secondary battery according to an embodiment of the invention.

Referring to FIGS. 1 and 2, the battery case 15 in this embodiment is a battery case made of metal (for example, it may be made of aluminum; battery cases made of plastic or a laminate film are also desirable), and has a flat, box-shaped (typically, cuboidal) case body (outer case) 30 that is open at the top and closed at the bottom, and a lid 25 which closes an opening 20 in the case body 30. The positive electrode terminal 60 that is electrically connected to the positive electrode 64 of the wound electrode assembly 50 and the negative electrode terminal 80 that is electrically connected to the negative electrode 84 of the wound electrode assembly 50 are provided on a top side (i.e., the lid 25) of the battery case 15. The lid 25 has formed therein an injection hole 45 for injecting the subsequently described nonaqueous electrolyte solution into the case body 30 (battery case 15) in which the wound electrode assembly 50 is housed. The injection hole 45 is sealed with a sealing plug 48 following the subsequently described injection step (S40). In addition, as in conventional lithium ion secondary batteries, the lid 25 is provided with a safety valve 40 for discharging, to the exterior of the battery case 15, gases that form at the interior of the battery case 15 during battery malfunction. The wound electrode assembly 50 is housed in the case body 30 with the winding axis of the wound electrode assembly 50 oriented laterally (that is, opening 20 is formed in a direction normal to the winding axis of the wound electrode assembly 50). The opening 20 in the case body 30 is then sealed with the lid 25, thereby producing the battery assembly 70. The lid 25 and the case body 30 are joined by welding or the like.

Injection Step (S40)

Next, the injection step (S40) is described. In this embodiment, the injection step entails injecting a nonaqueous electrolyte solution into the battery case. The nonaqueous electrolyte solution used in the injection step includes at least, as additives, lithium bis(oxalato)borate ($Li[B(C_2O_4)_2]$) (sometimes abbreviated below as "LiBOB") and a fluorophosphate compound in which fluorine and phosphorus serve as structural elements, and, as nonaqueous solvents, a carbonate solvent and an ether solvent. When the amount of nonaqueous solvent included in the nonaqueous electrolyte solution is set to 100 vol %, the amount of ether solvent included in the nonaqueous electrolyte solution is less than 10 vol % (e.g., from 3 vol % to 8 vol %). When the ether solvent included in the nonaqueous electrolyte solution is 10 vol % or more, compared with when the ether solvent included in the nonaqueous electrolyte solution is less than 10 vol %, the percent rise in battery resistance when charging and discharging of the secondary battery is repeatedly carried out tends to increase.

Although not particularly limited, the concentration of the lithium bis(oxalato)borate in the nonaqueous electrolyte solution is, for example, from 0.005 mol/L to 0.05 mol/L (e.g., from 0.01 mol/L to 0.03 mol/L).

The fluorophosphate compound in which fluorine and phosphorus serve as structural elements that is disclosed herein is not particularly limited, so long as it includes fluorine and phosphorus as structural elements. Examples include monofluorophosphoric acid salts and difluorophosphoric acid salts. Examples of monofluorophosphoric acid salts include lithium monofluorophosphate ($Li_2PO_3F$), sodium monofluorophosphate and potassium monofluorophosphate. Examples of difluorophosphoric acid salts include lithium difluorophosphate ($LiPO_2F_2$), sodium difluorophosphate and potassium difluorophosphate. The fluorophosphate compound decomposes in the subsequently described charge/discharge step, forming a film derived from this fluorophosphate compound (a compound in which fluorine and phosphorus serve as structural elements, such as a compound containing a $PO_2F_2$ anion or a $PO_3F$ anion) on the surface of the positive electrode (typically, the surface of the positive electrode active material). The use of lithium difluorophosphate is preferred.

Although not particularly limited, the concentration of fluorophosphate compound (e.g., lithium difluorophosphate) in the nonaqueous electrolyte solution is, for example, from 0.01 mol/L to 0.15 mol/L (e.g., from 0.02 mol/L to 0.1 mol/L, and preferably from 0.03 mol/L to 0.08 mol/L). If the content of the fluorophosphate compound is too much lower than 0.01 mol/L, it may not be possible to form a sufficient amount of film derived from the fluorophosphate compound on the surface of the positive electrode (typically, the positive electrode active material). On the other hand, if the content of the fluorophosphate compound is too much higher than 0.15 mol/L, an excessive amount of this film may end up forming on the surface of the positive electrode (typically, the positive electrode active material), which may increase the positive electrode resistance. Letting A be the concentration (mol/L) of the fluorophosphate compound in the nonaqueous electrolyte solution and B be the concentration (mol/L) of the lithium bis(oxalato)borate, these concentration are preferably adjusted in such a way that the ratio A/B therebetween is from 2.5 to 5. At a ratio A/B within this range, a lithium ion secondary battery having an excellent battery performance (e.g., capacity ratio) can be obtained.

The nonaqueous electrolyte solution disclosed herein includes at least, as nonaqueous solvents (organic solvents), a carbonate solvent and an ether solvent. Illustrative examples of carbonate solvents include cyclic carbonates such as ethylene carbonate (EC) and propylene carbonate (PC), and chain carbonates such as dimethyl carbonate (DMC), diethyl carbonate (DEC) and ethyl methyl carbonate (EMC). Illustrative examples of ether solvents include chain clic ethers such as dimethoxyethane (DME) and 1,2-dimethoxypropane (DMP), and cyclic ethers such as tetrahydrofuran and dioxane. The nonaqueous solvent may be of a single type used alone or may be of two or more types used in combination. Also, an aprotic solvent such as an ester solvent, a nitrile solvent, a sulfone solvent or a lactone solvent may be suitably used, in addition to or in place of the carbonate solvent, as the nonaqueous solvent included in the nonaqueous electrolyte solution. Illustrative examples of the ester solvent include cyclic esters such as y-butyrolactone and y-valerolactone, and acyclic esters such as methyl acetate and methyl propionate. The nonaqueous solvent may be of a single type used alone or may be of two or more types used in combination.

Within this nonaqueous electrolyte solution, a suitable supporting salt is dissolved in the nonaqueous solvent. Illustrative examples of the supporting salt include lithium salts such as $LiPF_6$, $LiClO_4$, $LiAsF_6$, $Li(CF_3SO_2)_2N$, $LiBF_4$ and $LiCF_3SO_3$. The supporting salt may be of a single type used alone or may be of two or more types used in combination. $LiPF_6$ is especially preferred. The concentration of the supporting salt is not particularly limited, although if it is too low, there is a tendency for the amount of charge carrier (typically, lithium ions) included in the nonaqueous electrolyte solution to be inadequate, resulting in a decrease in the ionic conductivity. On the other hand, if the concentration is too high, there is a tendency for the viscosity of the nonaqueous electrolyte solution to increase in the temperature region up to room temperature (e.g., from 0° C. to 30° C.), likewise resulting in a decrease in the ionic conductivity. Hence, it is preferable to set the concentration of the supporting salt to at least 0.1 mol/L (e.g., at least 0.8 mol/L), and not more than 2 mol/L (e.g., not more than 1.5 mol/L).

Charge/Discharge Step (S50)

Next, the charge/discharge step (S50) is described. In this embodiment, by charging the battery assembly 70 to a predetermined charge voltage, a film derived from lithium bis(oxalato)borate forms on the surface of the negative electrode active material in the negative electrode mixture layer 86 and a film derived from a fluorophosphate compound forms on the surface of the positive electrode active material in the positive electrode mixture layer 66.

In this step, for example, the battery assembly 70 is charged to the cutoff voltage (e.g., from 3.7 V to 4.1 V) during battery use at a charging rate of generally from 0.1 C to 2 C. In such initial charging, the $[B(C_2O_4)_2]$ within the electrode assembly decomposes and a film derived from $[B(C_2O_4)_2]$ forms in a desirable state (meaning that the film that has been formed on the surface of the negative electrode active material is in a state where variations in the amount of film have been minimized in the width direction perpendicular to the lengthwise direction of the negative electrode mixture layer 86) on the surface of the negative electrode active material within the negative electrode mixture layer 86. At the same time, the fluorophosphate compound within the nonaqueous electrolyte solution decomposes and a film derived from the fluorophosphate compound forms on the surface of the positive electrode active material in the positive electrode mixture layer 66. After the battery assembly 70 has been charged, discharging to a predetermined voltage (e.g., from 3 V to 3.2 V) is carried out at a discharging rate of generally from 0.1 C to 2 C. This charging and discharging is preferably repeated several times (e.g., three times). By thus carrying out charging and discharging treatment on the battery assembly 70, the battery assembly 70 becomes a working battery, that is, a lithium ion secondary battery (nonaqueous electrolyte secondary battery) 10 (see FIGS. 1 and 2). Here, "1 C" refers to the amount of current that can charge the battery in one hour to the battery capacity (Ah) predicted from the theoretical capacity of the positive electrode.

Next, the lithium ion secondary battery (nonaqueous electrolyte secondary battery) 10 manufactured by the manufacturing method disclosed herein is described.

Referring to FIG. 2, the lithium ion secondary battery 10 according to this embodiment has a nonaqueous electrolyte solution, and a wound or stacked electrode assembly 50 (here, a wound electrode assembly) that includes a positive electrode 64 and a negative electrode 84. The LiBOB and fluorophosphate compound that were not decomposed in the charge/discharge step remain in the nonaqueous electrolyte solution. The positive electrode 64 has a positive electrode current collector 62 and, formed on the surface of the positive electrode current collector 62, a positive electrode mixture layer 66 that contains at least a positive electrode active material. The negative electrode 84 has a negative electrode current collector 82 and, formed on the surface of the negative electrode current collector 82, a negative electrode mixture layer 86 that contains at least a negative electrode active material.

In cases where production has been carried out by a conventional method (i.e., cases where a large amount of Na ingredients from the positive electrode and the negative electrode dissolve in a LiBOB-containing nonaqueous electrolyte solution), both places where a large amount of sodium-containing film has formed and places where a small amount has formed are present in the center portion of the negative electrode mixture layer. However, the film that has formed on the surface of the negative electrode active material in the negative electrode mixture layer 86 of the lithium ion secondary battery 10 disclosed in this description can achieve a state in which variations in the amount of film have been minimized (preferably, a state where the film is uniform in the width direction). Hence, even after charging and discharging have been carried out repeatedly and the film has deteriorated, because the film does not deteriorate only in some places, local concentration of the current is prevented, thus suppressing the deposition of substances derived from the charge carrier (e.g., lithium metal). As a result, a lithium ion secondary battery (nonaqueous electrolyte secondary battery) 10 having a high battery performance (e.g., capacity ratio) can be obtained.

Examples of the invention are described below, although these examples are not intended to limit the invention in any way.

Manufacture of Lithium Ion Secondary Battery (Nonaqueous Electrolyte Secondary Battery)

EXAMPLE 1

First, a paste-like positive electrode mixture layer-forming composition was prepared by weighing out $LiNi_{1/3}Co_{1/3}Mn_{1/3}O_2$ as the positive electrode active material, acetylene black (AB) as the conductive material and polyvinylidene fluoride (PVDF) as the binder in the ratio 90:8:2, then dispersing these materials in N-methyl-2-pyrrolidone (NMP). This composition was coated to a thickness of 15 μm on a positive electrode current collector (aluminum foil). Next, the composition was dried for 6 hours in a 120° C. vacuum and was subjected to rolling treatment using a rolling press, thereby producing a positive electrode sheet made of a positive electrode mixture layer having a mixture density of 2.2 $g/cm^3$ formed on a positive electrode current collector (positive electrode preparation step). The coating weight of the composition was 12 $mg/cm^2$. The dimensions of the positive electrode sheet were set to 300 cm in the lengthwise direction and 9.5 cm in the width direction.

Next, a paste-like negative electrode mixture layer-forming composition was prepared by weighing out spherical graphite particles as the negative electrode active material, styrene-butadiene rubbers (SBR) as the binder and carboxymethyl cellulose (CMC) as the thickener in the ratio 98:1:1, then dispersing these materials in water. This composition was coated to a thickness of 10 pm on a negative electrode current collector (copper foil). Next, the composition was dried for 6 hours in a 120° C. vacuum and was subjected to rolling treatment using a rolling press, thereby producing a negative electrode sheet made of a negative electrode mixture layer having a mixture density of 1.1 $g/cm^3$ formed on a negative electrode current collector (negative electrode preparation step). The coating weight of the composition was 7.5 $mg/cm^2$. The dimensions of the negative electrode sheet were set to 320 cm in the lengthwise direction and 10.5 cm in the width direction.

The positive electrode mixture layer was peeled away for 5 cm in the lengthwise direction from one end of the positive electrode sheet in the lengthwise direction, thereby exposing the positive electrode current collector, and a positive electrode terminal made of aluminum was ultrasonically welded to the exposed positive electrode current collector. Similarly, the negative electrode mixture layer was peeled away for 2 cm in the lengthwise direction from one end of the negative electrode sheet in the lengthwise direction, thereby exposing the negative electrode current collector, and a negative electrode terminal made of nickel was ultrasonically welded to the exposed negative electrode current collector. The positive electrode sheet and negative electrode sheet to each of which a terminal had been attached were then wound together with two separator sheets (20 μm thick microporous resin sheets made of polyethylene) interposed therebetween, thereby producing a wound electrode assembly (electrode assembly production step). The electrode assembly was placed in a prismatic case, thereby producing a battery assembly according to Example 1 (battery assembly production step).

Next, 40 g of a nonaqueous electrolyte solution according to Example 1 was injected into the battery case of the battery assembly of Example 1 (injection step). The nonaqueous electrolyte solution used in Example 1 was prepared by dissolving lithium bis(oxalato)borate (LiBOB) and lithium difluorophosphate ($LiPO_2F_2$) as additives and $LiPF_6$ as the supporting salt in a mixed solvent obtained by mixing a nonaqueous solvent of ethylene carbonate (EC), dimethyl carbonate (DMC) and ethyl methyl carbonate (EMC) in the volumetric ratio 1:1:1 with dimethoxyethane (DME) as the ether solvent in the volumetric ratio of 97:3. The nonaqueous electrolyte solution had a LiBOB concentration of 0.015 mol/L, a $LiPO_2F_2$ concentration of 0.035 mol/L, and a $LiPF_6$ concentration of 1.1 mol/L. After injection, five charge/discharge cycles were carried out on the battery assembly of Example 1. The charge/discharge conditions in one cycle were as follows: at a temperature of 25° C., constant-current charging was carried out to 4.1 V at a charging rate of 1 C (4 A), followed by 10 minutes at rest, then constant-current discharging was carried out to 3 V at a discharging rate of 1 C (4 A), followed by 10 minutes at rest (preliminary charging step). This provided a negative electrode in which a lithium bis(oxalato)borate-derived film was formed on the surface of the negative electrode active material, and a positive electrode in which a lithium difluorophosphate-derived film was formed on the surface of the positive electrode active material, thereby producing a lithium ion secondary battery according to Example 1.

EXAMPLE 2

Aside from using a mixed solvent obtained by mixing a nonaqueous solvent of EC, DMC and EMC in the volumetric ratio 1:1:1 with DME as the ether solvent in the volumetric ratio 95:5, a lithium ion secondary battery according to Example 2 was produced in the same way as in Example 1.

EXAMPLE 3

Aside from using a mixed solvent obtained by mixing a nonaqueous solvent of EC, DMC and EMC in the volumetric ratio 1:1:1 with DME as the ether solvent in the volumetric ratio 92:8, a lithium ion secondary battery according to Example 3 was produced in the same way as in Example 1.

EXAMPLE 4

Aside from using a mixed solvent obtained by mixing a nonaqueous solvent of EC, DMC and EMC in the volumetric ratio 1:1:1 with DME as the ether solvent in the volumetric ratio 90:10, a lithium ion secondary battery according to Example 4 was produced in the same way as in Example 1.

EXAMPLE 5

Aside from using a mixed solvent obtained by mixing a nonaqueous solvent of EC, DMC and EMC in the volumetric ratio 1:1:1 with DMP as the ether solvent in the volumetric ratio 97:3, a lithium ion secondary battery according to Example 5 was produced in the same way as in Example 1.

EXAMPLE 6

Aside from using a mixed solvent obtained by mixing a nonaqueous solvent of EC, DMC and EMC in the volumetric ratio 1:1:1 with DMP as the ether solvent in the volumetric ratio 92:8, a lithium ion secondary battery according to Example 6 was produced in the same way as in Example 1.

EXAMPLE 7

Aside from using the nonaqueous electrolyte solution obtained by dissolving $LiPF_6$ in a nonaqueous solvent of EC, DMC and EMC in the volumetric ratio 1:1:1, a lithium ion secondary battery according to Example 7 was produced in the same way as in Example 1. The concentration of $LiPF_6$ in the nonaqueous electrolyte solution was 1.1 mol/L.

EXAMPLE 8

Aside from using the nonaqueous electrolyte solution obtained by dissolving LiBOB and $LiPF_6$ in a nonaqueous solvent of EC, DMC and EMC in the volumetric ratio 1:1:1, a lithium ion secondary battery according to Example 8 was produced in the same way as in Example 1. The concentration of LiBOB in the nonaqueous electrolyte solution was 0.015 mol/L and the concentration of $LiPF_6$ was 1.1 mol/L.

EXAMPLE 9

Aside from using the nonaqueous electrolyte solution obtained by dissolving LiBOB and $LiPF_6$ in a mixed solvent obtained by mixing a nonaqueous solvent of EC, DMC and EMC in the volumetric ratio 1:1:1 with DME as the ether solvent in a volumetric ratio of 97:3, a lithium ion secondary battery according to Example 9 was produced in the same way as in Example 1. The concentration of LiBOB in the nonaqueous electrolyte solution was 0.015 mol/L, and the concentration of $LiPF_6$ was 1.1 mol/L.

TABLE 1

| Example | LiBOB concentration (mol/L) | $LiPO_2F_2$ concentration (mol/L) | EC + DMC + EMC (vol %) | DME (vol %) | DMP (vol %) | Capacity ratio (%) | Rise in resistance (%) | Resistance to Li deposition (%) |
|---|---|---|---|---|---|---|---|---|
| 1 | 0.015 | 0.035 | 97 | 3 | 0 | 87.2 | 113 | 95 |
| 2 | 0.015 | 0.035 | 95 | 5 | 0 | 87.1 | 112.5 | 95.6 |
| 3 | 0.015 | 0.035 | 92 | 8 | 0 | 86.9 | 113.3 | 95.2 |
| 4 | 0.015 | 0.035 | 90 | 10 | 0 | 85.2 | 119.5 | 95.3 |
| 5 | 0.015 | 0.035 | 97 | 0 | 3 | 87 | 112.9 | 94.7 |
| 6 | 0.015 | 0.035 | 92 | 0 | 8 | 87.1 | 113 | 94.9 |
| 7 | 0 | 0 | 100 | 0 | 0 | 82.5 | 121.5 | 91 |
| 8 | 0.015 | 0 | 100 | 0 | 0 | 87 | 112 | 85.1 |
| 9 | 0.015 | 0 | 97 | 3 | 0 | 83.2 | 131 | 93.3 |

Measurement of Capacity Ratio

The capacity ratios of the lithium ion secondary batteries produced in Examples 1 to 9 were measured following 120 days of storage at 60° C. Measurement was carried out by charging of the batteries to 4.1 V at 1 C, followed by discharging to 3 V at 1/3 C. The capacity obtained at this time was treated as the initial battery capacity. Each secondary battery for which the initial battery capacity had been measured was adjusted to a state of charge (SOC) of 80%. Next, each of these secondary batteries was stored for 120 days at 60° C. in a thermostatic chamber, following which the battery capacity of each secondary battery after storage (battery capacity after storage) was measured by the same method as that used to measure the initial battery capacity. Here, the value obtained from the formula: (battery capacity after storage/initial battery capacity)×100; was treated as the capacity ratio (%) after 120 days of storage. The measurement results are presented in Table 1.

Measurement of Rise in Resistance

The rise in resistance after 120 days of storage at a temperature of 60° C. was measured for the lithium ion secondary batteries produced in Examples 1 to 9. First, the initial resistance was measured for each lithium ion secondary battery before storage. Measurement involved setting the state of charge (SOC) to 60% at 25° C. and a charging rate of 1C, then carrying out 10 seconds of constant-current discharge at 25° C. and a discharging rate of 35C, and determining the initial resistance from the slope of a first-order approximation curve of the current (I) versus voltage (V) plot values at this time. Next, each of the lithium ion secondary batteries after 120 days of storage was adjusted at a temperature of 25° C. to a SOC of 60% at a charging rate of 1 C, following which the resistance after 120 days of storage was determined in the same way as described above for initial resistance. The rise in resistance after storage was calculated from the following formula. The measurement results are shown in Table 1.

Rise in resistance (%) after 120 days of storage= (resistance after 120 days storage/initial resistance)×100

Test for Evaluating Lithium Deposition Resistance

The lithium ion secondary batteries produced in Examples 1 to 9 were subjected to 1,000 charge/discharge cycles and the lithium deposition resistance (%) after 1,000 cycles was evaluated. Here, "lithium deposition resistance (%)" refers to the capacity ratio (%) after 1,000 cycles. Each of the lithium ion secondary batteries was adjusted to a SOC of 90% and a constant-current constant-volume charging operation to 4.1 V at a charging rate of 10 C (40 A) and a constant-current discharging operation to 3.0 V at a discharging rate of 10 C (40 A) were repeated 1,000 times at a temperature of −30° C. The ratio of the discharge capacity after 1,000 cycles to the discharge capacity after 1 cycle (initial capacity), which ratio is expressed as: (discharge capacity after 1,000 cycles/initial capacity)×100; was calculated as the capacity ratio (%). Because the amount of decrease in capacity in this test is entirely attributable to lithium deposition, a larger capacity ratio following 1,000 cycles indicates a better lithium deposition resistance. The measurement results are shown in Table 1.

Figure 4:
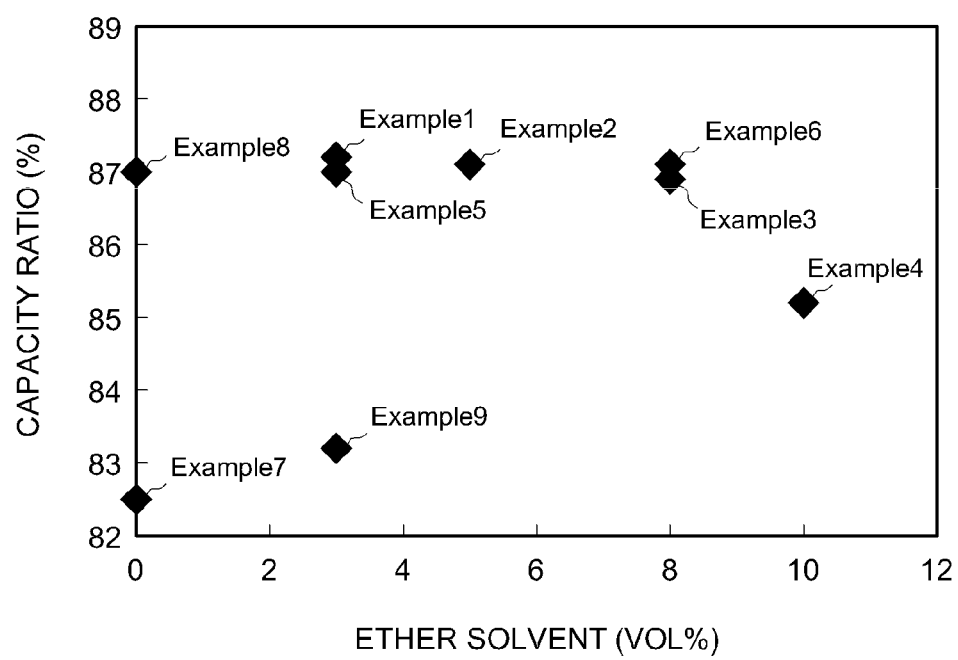
FIG. 4 is a graph showing the relationship between the capacity ratio and the ether solvent content.
Figure 5:
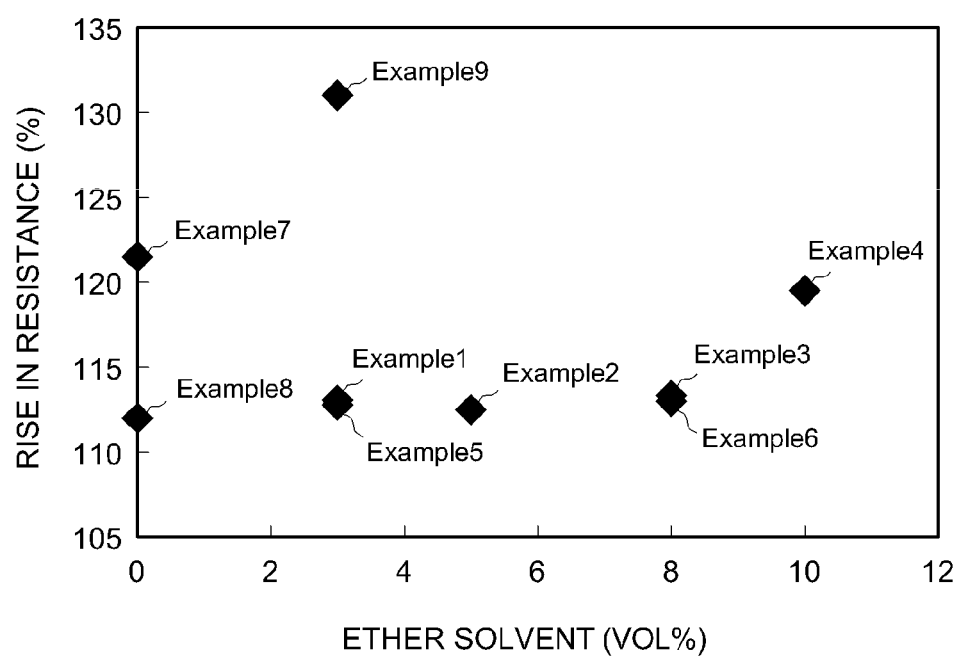
FIG. 5 is a graph showing the relationship between the rise in resistance and the ether solvent content.
Figure 6:
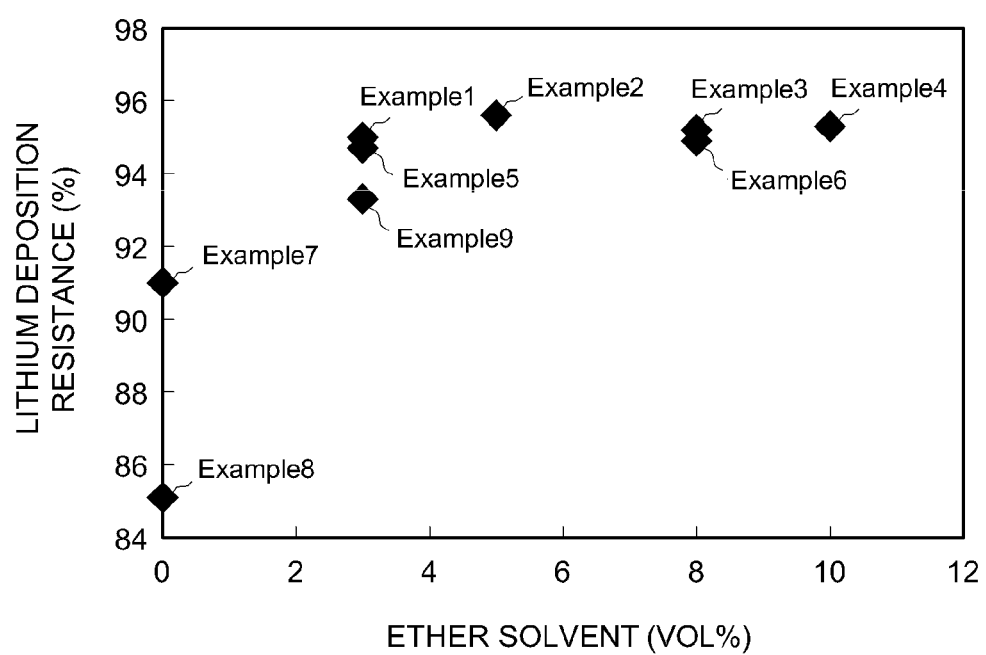
FIG. 6 is a graph showing the relationship between the lithium deposition resistance and the ether solvent content.

As shown in Table 1 and FIGS. 4 to 6, it was confirmed that although the capacity ratio rises and the percent rise in resistance decreases with the addition of LiBOB to the nonaqueous electrolyte solution, the lithium deposition resistance undergoes a large decrease (see Examples 7 and 8). It was also confirmed that, by using an ether solvent (here, DME) having a higher polarity than carbonate solvents as a portion of the nonaqueous solvent in the LiBOB-containing nonaqueous electrolyte solution in order to improve the lithium deposition resistance, the lithium deposition resistance does indeed undergo a large increase, but the capacity ratio decreases and the percent rise in resistance rises (see Examples 8 and 9). In addition, it was confirmed that when $LiPO_2F_2$ is added in order to suppress oxidative decomposition of the ether solvent at the positive electrode, the capacity ratio increases, the percent rise in resistance decreases and the lithium deposition resistance also increases (see Examples 1 and 9). At the same time, it was confirmed that a nonaqueous electrolyte solution in which the amount of ether solvent is 10 vol % (see Example 4), compared with a nonaqueous electrolyte solution in which the amount of ether solvent is less than 10 vol % (see Examples 1 to 3, 5 and 6), has a markedly increased percent rise in resistance.

Concrete examples of the invention have been described in detail above, although it should be noted that these are provided only by way of illustration and do not limit the scope of the claims, many variations and modifications to the examples presented above being encompassed by the art as set forth in the claims.

INDUSTRIAL APPLICABILITY

Figure 7:
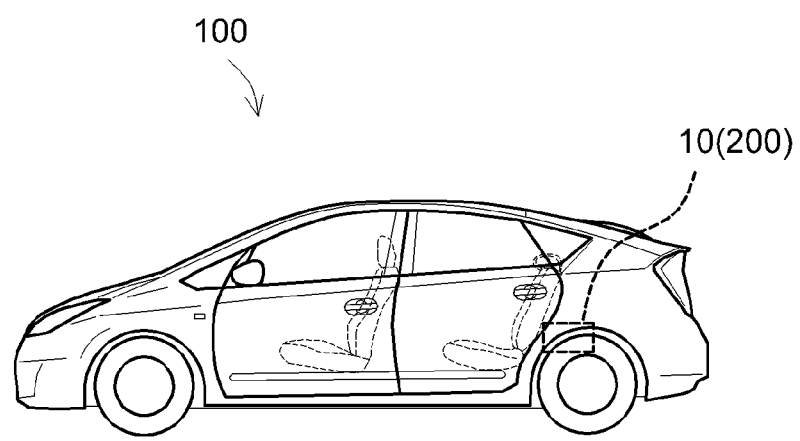
FIG. 7 is a side view schematically showing a vehicle (automobile) provided with a nonaqueous electrolyte secondary battery according to the invention.

The nonaqueous electrolyte secondary battery obtained by the manufacturing method according to this invention suppresses the deposition of substances derived from the charge carrier and has an excellent battery performance (e.g., capacity ratio), and therefore can be advantageously used in particular as a power source for electrical motors mounted in vehicles such as automobiles. Accordingly, this invention, as shown schematically in FIG. 7, provides vehicles 100 (typically, automobiles, and especially automobiles having electric motors, such as hybrid cars, electric cars and fuel cell cars) having such lithium ion secondary batteries 10 (typically, a battery pack 200 obtained by connecting in series a plurality of such batteries 10) as the power source.

REFERENCE SIGNS LIST

10 Lithium ion secondary battery (nonaqueous electrolyte secondary battery)
15 Battery case
20 Opening
25 Lid
30 Case body
40 Safety valve
45 Injection hole
48 Sealing plug
50 Wound electrode assembly
60 Positive electrode terminal
62 Positive electrode current collector
63 Positive electrode mixture layer-free region
64 Positive electrode
66 Positive electrode mixture layer
70 Battery assembly
80 Negative electrode terminal
82 Negative electrode current collector
83 Negative electrode mixture layer-free region
84 Negative electrode
86 Negative electrode mixture layer
90 Separator sheet
100 Vehicle (car)
200 Battery pack

The invention claimed is:

1. A method of manufacturing a nonaqueous electrolyte secondary battery, comprising the steps of:
providing a positive electrode that contains a positive electrode active material and a negative electrode that contains a negative electrode active material, at least one of the provided positive electrode and negative electrode including a sodium (Na) ingredient as an incidental impurity;
producing an electrode assembly from the provided positive electrode and negative electrode;
producing a battery assembly in which the electrode assembly is housed in a battery case;
injecting a nonaqueous electrolyte solution into the battery case, the nonaqueous electrolyte solution including at least, as additives, lithium bis(oxalato)borate and a fluorophosphate compound in which fluorine and phosphorus serve as structural elements and, as nonaqueous solvents, a carbonate solvent and an ether solvent, a ratio (A/B) between the molar concentration A of the fluorophosphate compound and the molar concentration B of the lithium bis(oxalato)borate being from 2.5 to 5, and the amount of ether solvent included in the nonaqueous electrolyte solution being less than 10 vol % when the amount of nonaqueous solvent included in the nonaqueous electrolyte solution is set to 100 vol %; and charging the battery assembly to a predetermined charge voltage, then discharging the battery assembly to a predetermined discharge voltage.

2. The manufacturing method according to claim 1, wherein a chain ether is used as the ether solvent.

3. The manufacturing method according to claim 2, wherein dimethoxyethane and/or 1,2-dimethoxypropane is used as the chain ether.

4. The manufacturing method according to claim 1, wherein the fluorophosphate compound is lithium difluorophosphate, the concentration of the lithium difluorophosphate in the nonaqueous electrolyte solution being from 0.03 mol/L to 0.08 mol/L.

5. The manufacturing method according to claim 1, wherein the concentration of lithium bis(oxalato)borate in the nonaqueous electrolyte solution is from 0.01 mol/L to 0.03 mol/L.

6. The manufacturing method according to claim 1, wherein a wound electrode assembly, which is obtained by stacking together a positive electrode formed as a sheet and a negative electrode formed as a sheet to obtain an electrode assembly, and winding the electrode assembly in a lengthwise direction of the electrode assembly, is used as the electrode assembly.

7. The manufacturing method according to claim 1, wherein a lithium-containing compound capable of intercalating and deintercalating lithium ions is used as the positive electrode active material.

8. A nonaqueous electrolyte secondary battery obtained by the manufacturing method according to claim 1.

9. A nonaqueous electrolyte solution adapted for use in nonaqueous electrolyte secondary batteries, comprising at least, as additives, lithium bis(oxalato)borate and a fluorophosphate compound in which fluorine and phosphorus serve as structural elements and, as nonaqueous solvents, a carbonate solvent and an ether solvent, wherein a ratio (A/B) between the molar concentration A of the fluorophosphate compound and the molar concentration B of the lithium bis(oxalato)borate is from 2.5 to 5, and the amount of ether solvent included in the nonaqueous electrolyte solution is less than 10vol % when the amount of nonaqueous solvent included in the nonaqueous electrolyte solution is set to 100 vol %.

10. The manufacturing method according to claim 1, wherein the nonaqueous solvent consists of the carbonate solvent and the ether solvent.

* * * * *